United States Patent
Narutomi et al.

(10) Patent No.: US 10,950,863 B2
(45) Date of Patent: Mar. 16, 2021

(54) BINDER COMPOSITION FOR NEGATIVE ELECTRODE, SLURRY FOR NEGATIVE ELECTRODE, NEGATIVE ELECTRODE, AND LITHIUM ION SECONDARY BATTERY

(71) Applicant: DENKA COMPANY LIMITED, Tokyo (JP)

(72) Inventors: Takuya Narutomi, Tokyo (JP); Jun Watanabe, Tokyo (JP); Shigeru Suzuki, Tokyo (JP)

(73) Assignee: DENKA COMPANY LIMITED, Tokyo (JP)

( * ) Notice: Subject to any disclaimer, the term of this patent is extended or adjusted under 35 U.S.C. 154(b) by 324 days.

(21) Appl. No.: 16/080,938

(22) PCT Filed: Mar. 8, 2017

(86) PCT No.: PCT/JP2017/009147
§ 371 (c)(1),
(2) Date: Aug. 29, 2018

(87) PCT Pub. No.: WO2017/154949
PCT Pub. Date: Sep. 14, 2017

(65) Prior Publication Data
US 2019/0027756 A1    Jan. 24, 2019

(30) Foreign Application Priority Data

Mar. 8, 2016   (JP) ............................. JP2016-044225

(51) Int. Cl.
| | | |
|---|---|---|
| *C08L 51/00* | (2006.01) | |
| *H01M 10/0525* | (2010.01) | |
| *H01M 4/133* | (2010.01) | |
| *H01M 4/134* | (2010.01) | |
| *H01M 4/62* | (2006.01) | |
| *C08F 261/04* | (2006.01) | |
| *C08K 7/06* | (2006.01) | |
| *C08K 3/34* | (2006.01) | |
| *C08K 3/04* | (2006.01) | |
| *C09D 151/00* | (2006.01) | |
| *H01M 4/04* | (2006.01) | |
| *H01M 4/02* | (2006.01) | |

(52) U.S. Cl.
CPC ........... *H01M 4/622* (2013.01); *C08F 261/04* (2013.01); *C08K 3/04* (2013.01); *C08K 3/34* (2013.01); *C08K 7/06* (2013.01); *C08L 51/003* (2013.01); *C09D 151/003* (2013.01); *H01M 4/0404* (2013.01); *H01M 4/133* (2013.01);

*H01M 4/134* (2013.01); *H01M 10/0525* (2013.01); *C08L 2203/20* (2013.01); *H01M 2004/027* (2013.01)

(58) Field of Classification Search
CPC ........................ C08L 51/003; C09D 151/003
See application file for complete search history.

(56) References Cited

U.S. PATENT DOCUMENTS

| 5,415,958 | A | 5/1995 | Takahashi et al. ............ 429/217 |
| 2007/0264568 | A1* | 11/2007 | Ryu ....................... H01M 4/386 429/213 |
| 2010/0255378 | A1 | 10/2010 | Bonnet et al. ............ 429/231.95 |
| 2014/0038048 | A1* | 2/2014 | Chung ................ H01M 4/1393 429/217 |
| 2016/0240854 | A1 | 8/2016 | Sakurai et al. .................... 4/622 |
| 2016/0380314 | A1 | 12/2016 | Yang et al. | |
| 2017/0092939 | A1 | 3/2017 | Kim et al. ........................ 4/366 |

FOREIGN PATENT DOCUMENTS

| EP | 3 109 924 A1 | 12/2016 |
| JP | H 06-172452 A | 6/1994 |
| JP | 2010-500440 A | 1/2010 |
| JP | 2010-521798 A | 6/2010 |
| JP | 2013-84351 A | 5/2013 |
| JP | 2013-98123 A | 5/2013 |
| JP | 2017-63026 A | 3/2017 |
| WO | WO 2009/115004 A1 | 9/2009 |
| WO | WO 2015/053224 A1 | 4/2015 |

OTHER PUBLICATIONS

International Search Report dated Jun. 6, 2017, issued to International Application No. PCT/JP2017/009147.

* cited by examiner

*Primary Examiner* — Haroon S. Sheikh
(74) *Attorney, Agent, or Firm* — Stein IP, LLC

(57) ABSTRACT

Provided is a binder composition for negative electrode that has good binding property with an active material and a metal foil and is superior in reduction resistance. A binder composition for negative electrode comprising a graft copolymer obtained by graft copolymerizing, with polyvinyl alcohol, a monomer containing (meth)acrylonitrile as a main component, wherein the polyvinyl alcohol has an average degree of polymerization of 300 to 3000; the polyvinyl alcohol has a saponification degree of 70 to 100 mol %; the graft copolymer has a polyvinyl alcohol amount of 10 to 90 mass %; and the graft copolymer has a poly(meth)acrylonitrile amount of 90 to 10 mass %.

13 Claims, No Drawings

BINDER COMPOSITION FOR NEGATIVE ELECTRODE, SLURRY FOR NEGATIVE ELECTRODE, NEGATIVE ELECTRODE, AND LITHIUM ION SECONDARY BATTERY

CROSS-REFERENCE TO RELATED APPLICATIONS

This application is a national stage of International Application No. PCT/JP2017/009147, filed Mar. 8, 2017, which claims the benefit of priority to Japanese Application No. 2016-044225, filed Mar. 8, 2016, in the Japanese Patent Office, the disclosures of which are incorporated herein by reference.

TECHNICAL FIELD

The present invention relates to a binder composition for negative electrode, a slurry for negative electrode using the binder composition, a negative electrode using the slurry, and a lithium ion secondary battery.

BACKGROUND

In recent years, secondary batteries have been used as power sources for electronic devices such as laptop computers and cellular phones, and development of hybrid vehicles and electric vehicles using a secondary battery as a power source for the purpose of reducing the environmental load has been promoted. A secondary battery having high energy density, high voltage and high durability is required for these power sources. Lithium-ion secondary battery is attracting attention as a secondary battery capable of achieving high voltage and high energy density.

Lithium ion secondary battery includes a positive electrode, a negative electrode, an electrolyte, and a separator, and the negative electrode includes a negative electrode active material, a conductive assistant, a metal foil, and a binder. As the binder, a fluorine-based resin such as polyvinylidene fluoride and polytetrafluoroethylene, a styrene-butadiene copolymer, and an acrylic copolymer are used (for example, refer to Patent Literatures 1 to 3).

However, in general, there had been cases where the conventional binder showed poor binding property with the metal foil. When charge and discharge were repeated, the binder was decomposed, and the negative electrode active material would peel off from the metal foil, thereby resulting in decrease in the battery capacity.

Patent Literature 4 discloses a binder composition for positive electrode in which polyacrylonitrile is graft-copolymerized with polyvinyl alcohol. However, there is no description about applying this binder composition for a positive electrode to a negative electrode binder composition.

CITATION LIST

Patent Literature

Patent Literature 1: JP 2013-98123 A
Patent Literature 2: JP 2013-84351 A
Patent Literature 3: JP H6-172452 A
Patent Literature 4: WO 2015/053224

SUMMARY OF THE INVENTION

Problems to be Solved by the Invention

In view of the above problems, an object of the present invention is to provide a binder, for example, having good binding property with an electrode and with an active material, and further having good reduction resistance.

Means to Solve the Problem

The present inventors have conducted diligent efforts to achieve the afore-mentioned object, and found that a polymer obtained by graft copolymerizing a monomer containing (meth)acrylonitrile as a main component with polyvinyl alcohol can serve as a binder having high reduction resistance and good binding property.

That is, the present invention provides a binder composition for negative electrode as described below.

(1) A binder composition for negative electrode comprising a graft copolymer obtained by graft copolymerizing, with polyvinyl alcohol, a monomer containing (meth)acrylonitrile as a main component, wherein the polyvinyl alcohol has an average degree of polymerization of 300 to 3000; the polyvinyl alcohol has a saponification degree of 70 to 100 mol %; the graft copolymer has a polyvinyl alcohol amount of 10 to 90 mass %; and the graft copolymer has a poly(meth)acrylonitrile amount of 90 to 10 mass %.

(2) The binder composition for negative electrode of (1), wherein the graft copolymer has a graft rate of 10 to 900%; and a homopolymer of poly(meth)acrylonitrile generated during the graft copolymerization has a mass average molecular weight of 30000 to 250000.

(3) A slurry for negative electrode comprising: the binder composition for negative electrode of (1) or (2); a negative electrode active material; and a conductive assistant.

(4) The slurry for negative electrode of (3), wherein a solid content of the binder composition for negative electrode is 1 to 20 mass % of a total solid of the slurry for negative electrode.

(5) The slurry for negative electrode of (3) or (4), wherein the negative electrode active material comprises at least one selected from graphite and silicon compounds.

(6) The slurry for negative electrode of any of (3) to (5), wherein the conductive assistant comprises at least one selected from the group consisting of: (i) fibrous carbon, (ii) carbon black, and (iii) carbon composite in which fibrous carbon and carbon black are combined with each other.

(7) A negative electrode, comprising: a metal foil; and a coating formed on the metal foil and comprising the slurry for negative electrode of any of (3) to (6).

(8) A lithium ion secondary battery comprising the negative electrode of (7).

Effect of the Invention

According to the present invention, it is possible to provide a binder composition for negative electrode that has, for example, good binding property with an active material and a metal foil and is superior in reduction resistance, so that cycle characteristics can be improved.

Mode for Carrying Out the Invention

Hereinafter, the embodiments for carrying out the present invention will be described in detail. Here, the present invention shall not be limited to the embodiments described below.

<Binder Composition for Negative Electrode>

The binder composition for negative electrode according to the embodiment of the present invention (hereinafter may be referred to as "binder composition") includes a graft copolymer obtained by graft copolymerizing, with polyvinyl alcohol (hereinafter may be abbreviated as PVA), a monomer containing (meth)acrylonitrile as a main component. This graft copolymer is a copolymer in which side chains of poly(meth)acrylonitrile (hereinafter may be abbreviated as PAN) are formed from the main chain of polyvinyl alcohol. In addition to the graft copolymer, a PAN homopolymer and/or a PVA homopolymer not involved in the graft copolymerization may be present in the binder composition. Therefore, in addition to the graft copolymer, the binder composition of the present embodiment may contain a PAN homopolymer and/or a PVA homopolymer as the resin component (polymer component).

The monomers to be grafted with PVA have (meth) acrylonitrile as an essential component from the viewpoint of reduction resistance. As monomers to be grafted with PVA, in addition to acrylonitrile, ethylenically unsaturated carboxylic acid esters such as methyl methacrylate, methyl acrylate, ethyl acrylate, butyl acrylate, 2-ethylhexyl methacrylate and 2-ethylhexyl acrylate; ethylenically unsaturated carboxylic acids such as (meth)acrylic acid, maleic anhydride and itaconic acid; and styrene can be used in combination to an extent so long as the reduction resistance of the binder would not be degraded. These monomers may be used alone, or two or more of these monomers may be used in combination. Of these, ethylenically unsaturated carboxylic acid esters are preferable, acrylic acid esters and/or methacrylic acid esters are more preferable, and methyl methacrylate is further more preferable. The monomer to be grafted with PVA is preferably composed of (meth)acrylonitrile alone or of (meth)acrylonitrile and methyl (meth) acrylate, and more preferably composed of (meth)acrylonitrile alone. Among (meth)acrylonitrile, acrylonitrile is preferable.

(Meth)acrylonitrile in the monomer grafted with PVA is the main component of the graft copolymerized monomer, and the content thereof is preferably 50 mass % or more of the graft copolymerized monomer. When (meth)acrylonitrile is less than 50 mass % of the graft copolymerized monomer, reduction resistance may decrease in some cases. The upper limit of the proportion of (meth)acrylonitrile among the graft copolymerized monomer may be 100 mass % or less. The composition of the monomer grafted with PVA can be determined by $^1$H-NMR (proton nuclear magnetic resonance spectroscopy).

The saponification degree of PVA is 70 to 100 mol % from the viewpoint of reduction resistance, and is preferably 80 to 99.5 mol %. When the saponification degree is less than 70 mol %, reduction resistance may decrease in some cases. Further, saponification exceeding 99.5 mol % may be difficult in production. The saponification degree of PVA mentioned here is a value measured by a method in accordance with JIS K 6726.

The average degree of polymerization of PVA is 300 to 3000 from the viewpoints of solubility, binding property and viscosity of the binder. The average degree of polymerization of PVA is preferably 320 to 2950, more preferably 500 to 2500, and even more preferably 500 to 1800. When the average degree of polymerization of PVA is less than 300, the binding property of the binder with the negative electrode active material and with the conductive assistant decreases and the durability may decrease in some cases. In addition, when the average degree of polymerization of PVA exceeds 3000, solubility decreases and viscosity increases, making it difficult to produce the slurry for negative electrode in some cases. Further, the average degree of polymerization of PVA is preferably 500 to 3000, more preferably 1000 to 3000, from the viewpoint of binding property. The average degree of polymerization of PVA mentioned here is a value measured by a method in accordance with JIS K 6726.

The graft rate of the graft copolymer is preferably 10 to 900%, more preferably 100 to 800%. When the graft rate is less than 150%, reduction resistance may decrease in some cases. In addition, when the graft rate exceeds 900%, adhesive property may decrease in some cases. Since there are cases where a PAN homopolymer is formed when the graft copolymer is formed (during graft copolymerization), it is necessary to separate the PAN homopolymer from the graft copolymer in order to calculate the graft rate. The PAN homopolymer can be dissolved in dimethylformamide (hereinafter may be abbreviated as DMF); however, PVA and graft copolymerized PAN do not dissolve in DMF. By utilizing this difference in solubility, PAN homopolymer can be separated by an operation such as centrifugal separation.

Specifically, a graft copolymer with a known PAN content is immersed in a predetermined amount of DMF to allow elution of the PAN homopolymer into DMF. Subsequently, the liquid into which the graft copolymer was immersed is separated into DMF soluble matter and DMF insoluble matter by centrifugation.

Here, when a, b, and c are defined as follows:
a: amount of graft copolymer used for the measurement
b: mass % of PAN in graft copolymer used for the measurement
c: amount of insoluble matter in DMF The graft rate can be calculated from the following formula (1).

$$\text{graft rate} = [c - a \times (100-b) \times 0.01]/[a \times (100-b) \times 0.01] \times 100(\%) \quad (1)$$

The graft rate of the graft copolymer obtained from the above formula (1) is preferably 150 to 900% from the viewpoint of enhancing the binding property with the active material and enhancing the ability to coat the active material.

The binder composition of the present invention may contain, besides the graft copolymer, a PAN homopolymer and a PVA homopolymer, which may be generated during the production of the graft copolymer. Here, the PAN homopolymer preferably have a mass average molecular weight of 30000 to 250000, and more preferably 80000 to 150000. In order to suppress the viscosity increase of the PAN homopolymer to allow easy manufacture of the slurry for negative electrode, the mass average molecular weight of the PAN homopolymer is preferably 250000 or less, more preferably 200000 or less, and further preferably 150000 or less. Here, the mass average molecular weight of the PAN homopolymer can be obtained by GPC (gel permeation chromatography).

The amount of PVA in the graft copolymer is 10 to 90 mass %, preferably 40 to 60 mass %, from the viewpoint of binding property. The amount of PVA in the graft copolymer is preferably 40 mass % or more, more preferably 50 mass % or more, from the viewpoint of particularly enhancing the binding property. From the viewpoint of reduction resistance, the amount of PVA in the graft copolymer is preferably 10 to 39 mass %, more preferably 10 to 20 mass %. Here, in the present invention, the amount of PVA in the graft copolymer is defined as a mass ratio of the amount of PVA in the graft copolymer and the amount of PVA homopolymer per the sum of the graft copolymer, PAN homopolymer, and PVA homopolymer.

The amount of PAN in the graft copolymer is 90 to 10 mass %, preferably 60 to 40 mass %, from the viewpoint of binding property. From the viewpoint of reduction resistance, the amount of PAN in the graft copolymer is preferably 90 to 61 mass %, more preferably 90 to 80 mass %. When the amount of PAN exceeds 90 mass %, the binding property may be degraded in some cases. In addition, when the amount of PAN is less than 10 mass %, the reduction resistance may be degraded in some cases.

Here, in the present invention, the amount of PAN in the graft copolymer is defined as a mass ratio of the amount of PAN graft copolymerized and the amount of PAN homopolymer per the sum of the graft copolymer, PAN homopolymer, and PVA homopolymer.

The composition ratio of the graft copolymer (composition ratio of resin component in binder composition) can be calculated from the reaction rate (polymerization rate) of (meth)acrylonitrile and the composition of the amount stocked for each component used in the polymerization.

The mass proportion of PAN generated during copolymerization, that is, the proportion of the sum of PAN and PAN homopolymer grafted with PVA can be calculated from the polymerization rate of (meth)acrylonitrile and the mass of (meth)acrylonitrile stocked. Further, by taking the ratio of the mass of PAN to the mass of stocked PVA, the mass ratio of PVA to PAN can be calculated.

Specifically, the mass % of PAN in the graft copolymer can be obtained from the following formula (2).

$$\text{mass \% of PAN in the graft copolymer} = d \times 0.01 \times e/(f + d \times 0.01 \times e) \times 100 (\%) \quad (2)$$

Here, in the formula (2), d is the polymerization rate (%) of (meth)acrylonitrile, e is the mass amount of (meth)acrylonitrile used for graft copolymerization (amount stocked), and f is the mass amount of PVA used for graft copolymerization (amount stocked).

The composition ratio of the graft copolymer (composition ratio of the resin component in the binder composition) can also be determined by $^1$H-NMR. For example, when a monomer other than (meth)acrylonitrile is used in graft copolymerization in addition to (meth)acrylonitrile, it becomes difficult to calculate the composition ratio using the above formula (2), and therefore the composition ratio can be determined by $^1$H-NMR. The measurement by $^1$H-NMR can be carried out under the following conditions; measurement solvent: dimethyl sulfoxide, measurement cell: 5 mm$\varphi$, sample concentration: 50 mg/1 ml, measurement temperature: 30° C., using the device available under the trade name of "ALPHA 500" (manufactured by JEOL Ltd.).

The method for manufacturing the binder composition of the present embodiment is not particularly limited, and it is preferable that polyvinyl acetate is polymerized and saponified to obtain PVA, and then a monomer containing (meth)acrylonitrile as a main component is graft copolymerized with PVA.

As a method of polymerizing polyvinyl acetate, any known method such as bulk polymerization, solution polymerization and the like can be used.

Examples of the initiator used for polymerization of polyvinyl acetate include azo initiators such as azobisisobutyronitrile, organic peroxides such as benzoyl peroxide and bis (4-t-butylcyclohexyl) peroxydicarbonate, and the like.

The saponification reaction of polyvinyl acetate can be carried out, for example, by saponification in an organic solvent in the presence of a saponification catalyst.

Examples of the organic solvent include methanol, ethanol, propanol, ethylene glycol, methyl acetate, ethyl acetate, acetone, methyl ethyl ketone, benzene, toluene and the like. These organic solvents may be used alone or in combination of two or more. Among these, methanol is preferred.

Examples of the saponification catalyst include basic catalysts such as sodium hydroxide, potassium hydroxide and sodium alkoxide, and acidic catalysts such as sulfuric acid and hydrochloric acid. Among these, basic catalysts are preferred. Among basic catalysts, sodium hydroxide is preferable from the viewpoint of the saponification velocity.

The method of graft copolymerizing a monomer containing (meth)acrylonitrile as a main component with polyvinyl alcohol can be carried out by solution polymerization. Examples of the solvent used include dimethylsulfoxide, N-methylpyrrolidone and the like.

Examples of the initiator used for graft copolymerization include organic peroxides such as benzoyl peroxide, azo compounds such as azobisisobutyronitrile, potassium peroxodisulfate, ammonium peroxodisulfate and the like.

The binder composition of the present embodiment can be dissolved in a solvent for usage. Examples of the solvent include dimethylsulfoxide, N-methylpyrrolidone and the like. The binder composition preferably includes these solvents, and one or two or more of these solvents may be included.

Since the binder composition of the present embodiment described in detail above contains the afore-mentioned graft copolymer, binding property with respect to the negative electrode active material and the metal foil is superior. Further, the binder composition covers the active material. Therefore, with the slurry for negative electrode including this binder composition, cycle characteristics and rate characteristics using a negative electrode active material, a lithium ion secondary battery, and an electrode for obtaining such lithium ion secondary battery can be obtained. Therefore, the binder composition of the present embodiment is more suitable for the lithium ion secondary battery.

<Slurry for Negative Electrode>

The slurry for negative electrode according to the present invention comprises the afore-mentioned binder composition; a negative electrode active material; and a conductive assistant.

<Negative Electrode Active Material>

Examples of the negative electrode active material include graphite materials such as natural graphite, artificial graphite and polyacene, silicon compounds, tin compounds, germanium compounds, lithium titanate and the like. These may be used alone, or two or more of them may be used in combination. Among these, at least one selected from carbon materials and silicon compounds is preferable, and at least one selected from graphite and silicon compounds is more preferable.

Examples of the silicon compounds include, for example, (i) silicon fine particles, (ii) an alloy of silicon with tin, nickel, copper, iron, cobalt, manganese, zinc, indium, silver, titanium, germanium, bismuth, antimony or chromium, (iii) compounds of boron, nitrogen, oxygen or carbon with silicon, (iv) compounds containing the compounds of (iii) and the metal exemplified in (ii), and the like. One example of the alloy or compounds of silicon is $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiOx$ ($0 < x \leq 2$) or $LiSiO$ and the like. Examples of the negative electrode active material containing a tin atom include, for example, (i) an alloy of tin with silicon, nickel, copper, iron, cobalt, manganese, zinc, indium, silver, titanium, germanium, bismuth, antimony or chromium, (ii) compounds of oxygen or carbon with tin, (iii) these compounds of (ii) further containing the metal exemplified in (i), and the like.

Examples of the tin compounds include $SnO_w$ (0<w≤2), $SnSiO_3$, $LiSnO$, $Mg_2Sn$ and the like.

Examples of the germanium compounds include oxides, carbides, nitrides, carbonitrides and the like of germanium.

The surface of these negative electrode active materials may be covered with a material having conductivity such as carbon or copper for the purpose of improving conductivity.

<Conductive Assistant>

The slurry for negative electrode of the present embodiment can contain a conductive assistant. As the conductive assistant, carbon materials are preferable, while it is preferable to exclude graphite and polyacene. Among the carbon materials, it is preferable to use at least one selected from the group consisting of (i) fibrous carbon, (ii) carbon black, and (iii) carbon composite in which fibrous carbon and carbon black are combined with each other. As the fibrous carbon, vapor phase growth carbon fiber, carbon nanotube, carbon nanofiber and the like can be mentioned. Examples of the carbon black include acetylene black, furnace black, Ketjen black (registered trademark), and the like can be mentioned. These conductive assistants can be used alone, or two or more of the conductive assistants can be used in combination. Among these, one or two or more conductive assistants selected from the group consisting of acetylene black, carbon nanotube, and carbon nanofiber are preferable.

The slurry for negative electrode of the present embodiment can contain, in order to improve the conductivity imparting ability of the conductive assistant and the negative electrode active material and improve conductivity, carbon composite in which a plurality of kinds of conductive assistants and active materials are combined with each other. For example, in the case of a slurry for an electrode of lithium ion secondary battery, a carbon composite in which fibrous carbon and carbon black are combined with each other, and a composite in which a carbon-coated negative electrode active material is combined with fibrous carbon and carbon black can be mentioned. The carbon composite in which fibrous carbon and carbon black are combined with each other is obtained, for example, by calcinating a mixture of fibrous carbon and carbon black. In addition, a mixture of the carbon composite thus obtained and the negative electrode active material can be prepared and calcinated, and the product thus obtained can also be used as the carbon composite.

The slurry for negative electrode of the present embodiment comprises the afore-mentioned binder composition for negative electrode, the negative electrode active material, and the conductive assistant. The binder composition (the binder composition may contain a binder solution), the negative electrode active material, and the conductive assistant are not particularly limited. Here, from the viewpoint of enhancing the binding property and from the viewpoint of imparting good characteristics to the lithium ion secondary battery when such battery is manufactured, the contents are preferably in the following range.

The solid content of the afore-mentioned binder composition is preferably 1 to 20 mass %, more preferably 2 to 15 mass %, further more preferably 3 to 10 mass %, based on the total solids in the slurry for negative electrode.

The content of the afore-mentioned negative electrode active material is preferably 50 to 95 mass %, more preferably 60 to 95 mass %, further more preferably 70 to 90 mass %, based on the total solids in the slurry for negative electrode.

The content of the afore-mentioned conductive assistant is preferably 1 to 10 mass %, and more preferably 3 to 7 mass %, based on the total solids in the slurry for negative electrode.

The content of the conductive assistant is preferably 1 to 10 parts by mass, more preferably 3 to 7 parts by mass, based on 100 parts by mass of the total amount of the binder, active material, and conductive assistant. By controlling the content of the conductive assistant to 1 part by mass or more, the high-speed charging characteristics and the high output characteristics of the lithium ion secondary battery can be improved. Further, by controlling the content to 10 parts by mass or less, a negative electrode with even higher density can be obtained. Accordingly, the charge/discharge capacity of the battery becomes superior.

<Negative Electrode>

The negative electrode according to the embodiment of the present invention is manufactured using the slurry for negative electrode described above. The negative electrode is preferably manufactured using a metal foil and the afore-mentioned slurry for negative electrode provided on the metal foil. The negative electrode is preferably for a lithium ion secondary battery electrode.

(Negative Electrode)

The negative electrode of the present embodiment is preferably manufactured by coating the metal foil with the afore-mentioned slurry for negative electrode, followed by drying to form a coating. As the metal foil, copper in the form of foil is preferably used, and the thickness is preferably 1 to 150 μm, more preferably 5 to 30 μm from the viewpoint of workability.

<Manufacturing Method of Negative Electrode>

As a method for coating with the slurry for negative electrode on the metal foil, a known method can be used. Examples of the method include a reverse roll method, a direct roll method, a blade method, a knife method, an extrusion method, a curtain method, a gravure method, a bar method, a dipping method, and a squeeze method. Among these, the blade method (comma roll or die cutting), the knife method and the extrusion method are preferable. Here, by selecting the coating method in accordance to the physical properties of the solution and to the drying properties of the binder, a good surface condition can be obtained with the coating layer. Coating may be applied to one side or both sides. When the coating is applied to both sides, application may be done with one side at a time or both sides simultaneously.

The coating may be continuous, intermittent, or striped. The coating thickness, length, and width of the slurry for negative electrode may be determined arbitrarily depending on the size of the battery. For example, the coating thickness of the slurry for negative electrode, that is, the thickness of the negative electrode plate can be in the range of 10 μm to 500 μm.

As a method for drying the slurry for negative electrode, methods that are generally adopted can be used. In particular, it is preferable to use hot wind, vacuum, infrared, far infrared, electron beam, and low temperature wind alone or in combination.

The negative electrode can be pressed if necessary. As the pressing method, methods that are generally adopted can be used. Particularly, a die pressing method or a calendar pressing method (cold or hot roll) is preferable. The pressing pressure in the calendar pressing method is not particularly limited, and is preferably 0.2 to 3 ton/cm.

<Lithium Ion Secondary Battery>

The lithium ion secondary battery according to the embodiment of the present invention is manufactured using the afore-mentioned negative electrode and preferably includes a positive electrode, the afore-mentioned negative electrode, a separator, and an electrolyte solution (electrolyte and electrolytic solution).

<Positive Electrode>

The positive electrode used in the lithium ion secondary battery of the present embodiment is not particularly limited, and can be manufactured using a slurry for positive electrode containing a positive electrode active material. This positive electrode can be manufactured, for example, by using a positive electrode metal foil and a slurry for positive electrode provided on the metal foil. The slurry for positive electrode preferably contains a positive electrode binder, a positive electrode active material, and the afore-mentioned conductive assistant. The positive electrode binder is not particularly limited. Here, for example, fluororesin such as polyvinylidene fluoride and polytetrafluoroethylene, styrene-butadiene copolymer, acrylic copolymer and the like can be used. As the positive electrode binder, fluororesin is preferable. Among the fluororesin, it is preferable to use at least one from polyvinylidene fluoride and polytetrafluoroethylene, and polyvinylidene fluoride is more preferable.

The positive electrode active material is selected from the group consisting of $LiCoO_2$, $LiNiO_2$, $Li(Co_xNi_yMn_z)O_2$ (0<X<1, 0<Y<1, 0<Z<1 and X+Y+Z=1), $Li(Ni_xAl_yCo_z)O_2$ (0<X<1, 0<Y<1, 0<Z<1 and X+Y+Z=1), $LiMn_2O_4$, $LiNi_xMn_{(2-x)}O_4$ (0<X<2), $LiFePO_4$, $LiMnPO_4$, $LiFe_xMn_{(1-x)}PO_4$ (0<X<1), $LiCoPO_4$, $Li_3V_2(PO_4)_3$, and $LiNiPO_4$. These may be used alone, or two or more of these can be used in combination.

The slurry for positive electrode of the present embodiment comprises the afore-mentioned binder composition for positive electrode; the positive electrode active material; and the conductive assistant. The contents of the afore-mentioned binder composition (the binder composition may contain a binder solution), the positive electrode active material, and the conductive assistant are not particularly limited. Here, from the viewpoint of enhancing binding property and from the viewpoint of imparting good characteristics to the lithium ion secondary battery when such battery is manufactured, the contents are preferably in the following range.

The solid content of the afore-mentioned binder composition is preferably 1 to 20 mass %, more preferably 2 to 15 mass %, further more preferably 3 to 10 mass %, based on the total solid content in the slurry for positive electrode.

The content of the afore-mentioned positive electrode active material is preferably 50 to 95 mass %, more preferably 60 to 95 mass %, further more preferably 70 to 90 mass %, based on the total solid content in slurry for positive electrode.

The content of the afore-mentioned conductive assistant is preferably 1 to 10 mass %, and more preferably 3 to 7 mass %, based on the total solid in the slurry for negative electrode.

As the metal foil for positive electrode, aluminum in the form of foil is preferably used, and the thickness is preferably 5 to 30 μm from the viewpoint of workability. The positive electrode can be manufactured by using the slurry for positive electrode and the positive electrode metal foil in accordance with a method similar to the afore-mentioned manufacturing method of the negative electrode.

<Separator>

Regarding a separator, any separator may be used so long as it has sufficient strength, such as electrically insulating porous membrane, net, nonwoven fabric and the like. In particular, it is preferable to use a separator having low resistance to ion migration of the electrolytic solution and excellent solution retention. Material of the separator is not particularly limited, and inorganic fibers such as glass fibers, organic fibers, synthetic resins such as polyethylene, polypropylene, polyester, polytetrafluoroethylene and polyflon or layered composites thereof can be mentioned as an example. From the viewpoints of adhesive property and safety, polyethylene, polypropylene and the layered composite film thereof are preferable.

<Electrolyte>

As the electrolyte, there is no particular limitation, and any known lithium salts can be used. Examples thereof include $LiClO_4$, $LiBF_4$, $LiBF_6$, $LiPF_6$, $LiCF_3SO_3$, $LiCF_3CO_2$, $LiAsF_6$, $LiSbF_6$, $LiB_{10}Cl_{10}$, $LiAlCl_4$, $LiCl$, $LiBr$, $LiI$, $LiB(C_2H_5)_4$, $LiCF_3SO_3$, $LiCH_3SO_3$, $LiCF_3SO_3$, $LiC_4F_9SO_3$, $LiN(CF_3SO_2)_2$, $LiN(C_2F_5SO_2)_2$, $LiC(CF_3SO_2)_3$, lower fatty acid lithium carboxylate and the like.

<Electrolytic Solution>

The electrolytic solution for dissolving the electrolyte is not particularly limited. As the electrolytic solution, for example, carbonates such as propylene carbonate, ethylene carbonate, dimethyl carbonate, diethyl carbonate and methyl ethyl carbonate, lactones such as γ-butyrolactone, ethers such as trimethoxymethane, 1,2-dimethoxyethane, diethyl ether, 2-ethoxyethane, tetrahydrofuran and 2-methyltetrahydrofuran, sulfoxides such as dimethylsulfoxide, oxolanes such as 1,3-dioxolane and 4-methyl-1,3-dioxolane, nitrogen-containing compounds such as acetonitrile, nitromethane and N-methyl-2-pyrrolidone, esters such as methyl formate, methyl acetate, ethyl acetate, butyl acetate, methyl propionate, ethyl propionate and phosphoric acid triester, ionorganic acid esters such as sulfuric acid esters, nitric acid esters, and hydrochloric acid esters, amides such as dimethylformamide and dimethylacetamide, glymes such as diglyme, triglyme and tetraglyme, ketones such as acetone, diethyl ketone, methyl ethyl ketone and methyl isobutyl ketone, sulfolanes such as sulfolane, oxazolidinones such as 3-methyl-2-oxazolidinone, and sultones such as 1,3-propanesultone, 4-butanesultone and naphthasultone can be mentioned. One or more of these electrolytic solutions can be selected for usage.

Among the afore-mentioned electrolyte and electrolytic solution, an electrolyte solution in which $LiPF_6$ is dissolved in carbonates is preferable, and the concentration of the electrolyte in the solution varies depending on the electrode and electrolytic solution used. Here, the concentration is preferably 0.5 to 3 mol/L.

EXAMPLES

Hereinafter, the present invention will be described more specifically referring to examples and comparative examples. Here, the present invention shall not be limited to these.

Example 1

<Preparation of PVA>

Vinyl acetate (600 parts by mass) and methanol (400 parts by mass) were stocked, followed by deoxygenation by bubbling nitrogen gas. Subsequently, bis (4-t-butylcyclohexyl) peroxydicarbonate (0.3 parts by mass) as a polymerization initiator was stocked, and polymerization was carried out at 60° C. for 4 hours. The solid content concentration of the polymerization solution at the time of termination of the polymerization was 48%, and the polymerization rate of vinyl acetate determined from the solid content was 80%. Methanol vapor was blown into the obtained polymerization solution to remove unreacted vinyl acetate and then the resultant solution was diluted with methanol so that the concentration of polyvinyl acetate would be 40 mass %. To the diluted polyvinyl acetate solution (1200 parts by mass), 10 mass % methanol solution of sodium hydroxide (20 parts by mass) was added. Saponification reaction was carried out at 30° C. for 1.5 hours.

The solution after saponification was neutralized with acetic acid, filtered and dried at 100° C. for 2 hours to obtain PVA. The average degree of polymerization of the obtained PVA was 320 and the saponification degree was 86.3 mol %.
<Polymerization Degree and Saponification Degree>

The average degree of polymerization and the saponification degree of PVA was measured in accordance with the method provided in JIS K 6726.
<Preparation of Binder A>

Hereinafter, the preparation method of binder A is described. In this embodiment, the binder means a graft copolymer according to the present invention.

PVA obtained (8.00 parts by mass) was added to dimethylsulfoxide (265.1 parts by mass), and was allowed to dissolve by stirring at 60° C. for 2 hours. Subsequently, ammonium peroxodisulfate (0.03 parts by mass) dissolved in acrylonitrile (30.3 parts by mass) and dimethylsulfoxide (3 parts by mass) were added at 60° C., followed by graft copolymerization with agitation at 60° C. Four hours after the initiation of polymerization, the polymerization was terminated by cooling the reaction mixture to room temperature.
<Precipitation and Drying>

The obtained reaction solution containing binder A (297 parts by mass) was added dropwise to methanol (2970 parts by mass) to precipitate binder A. The polymer was separated by filtration, vacuum dried for 2 hours at room temperature, and further vacuum dried at 80° C. for 2 hours. The solid content was 8.87 mass %, and the polymerization rate of acrylonitrile was 24.5% when calculated from the solid content.

The mass of PAN in the obtained binder A was 44.5 mass % of the total polymer, the graft rate was 78%, and the mass average molecular weight of the PAN homopolymer was 105100. Measurement methods of these values will be described in the following <Composition Ratio>, <Graft Rate> and <Mass Average Molecular Weight>.
<Composition Ratio>

Composition ratio of binder A was calculated from the reaction rate (polymerization rate) of acrylonitrile and the composition of each of the stocked component used for polymerization. The mass % of PAN formed at the time of copolymerization (mass % of PAN in the graft copolymer) was calculated from the polymerization rate (%) of acrylonitrile, mass of acrylonitrile used for graft copolymerization (amount stocked), and mass of PVA used for graft copolymerization (amount stocked), using the aforementioned formula (2). Here, the "mass ratio" in the following table is the mass ratio in the resin component including the graft copolymer itself, and the PVA homopolymer and the PAN homopolymer formed during the copolymerization.
<Graft Rate>

Binder A (1.00 g) was precisely weighed and added to special grade DMF (50 cc, manufactured by KOKUSAN CHEMICAL Co., Ltd.), and the mixture was stirred at 80° C. for 24 hours. Subsequently, the mixture was centrifuged at 10000 rpm for 30 minutes with a centrifugal separator (model: H2000B, rotor: H, manufactured by KOKUSAN Co. Ltd.). After carefully separating the filtrate (DMF soluble matter), the matter insoluble in the pure water was vacuum dried at 100° C. for 24 hours. The graft rate was calculated using the formula (1) described above.
<Mass Average Molecular Weight>

The filtrate (DMF soluble matter) obtained after centrifugation was poured into methanol (1000 ml) to give a precipitate. The precipitate was vacuum dried at 80° C. for 24 hours, and mass average molecular weight expressed in terms of standard polystyrene was measured by GPC. GPC measurement was carried out under the following conditions.

Column: two columns (GPC LF-804, φ8.0×300 mm, manufactured by Showa Denko K.K.) were connected in series and used.

Column temperature: 40° C.

Solvent: 20 mM-LiBr/DMF
<Reductive Degradation Potential>

Binder A (10 parts by mass) was dissolved in N-methylpyrrolidone (90 parts by mass) to obtain a polymer solution. Subsequently, acetylene black (1 part by mass, Denka Black (registered trademark) "HS-100" manufactured by Denka Company Limited) was added to the obtained polymer solution (100 parts by mass), and the mixture was stirred. The obtained solution was applied to a copper foil so as to provide a dry thickness of 20 μm, preliminarily dried at 80° C. for 10 minutes, and then dried at 105° C. for 1 hour to give a test piece.

The obtained test piece was used as the working electrode, lithium was used as the counter electrode and reference electrode, and a solution of ethylene carbonate/diethyl carbonate (=½ (volume ratio), concentration of 1 mol/L) in which $LiPF_6$ was used as an electrolyte salt was used as the electrolytic solution, thereby assembling a three-pole cell (manufactured by TOYO SYSTEM CO., LTD.). Linear sweep voltammetry (hereinafter abbreviated as LSV) was performed at 25° C. with a scanning speed of 10 mV/sec using a Potentiostat/Galvanostat (1287 type, manufactured by Solartron Analytical). The reductive degradation potential was defined as the potential when the current reached 0.1 $mA/cm^2$. The lower the reductive degradation potential, the more difficult for the reductive degradation to occur, and thus it can be considered that reduction resistance is high.

TABLE 1

|  | Example 1 | Example 2 | Example 3 | Example 4 | Example 5 | Example 6 | Example 7 | Example 8 | Example 9 |
|---|---|---|---|---|---|---|---|---|---|
| Binder | A | B | C | D | E | F | G | H | I |
| Polymerization degree of PVA | 320 | 1650 | 2990 | 1740 | 1610 | 1820 | 2230 | 1980 | 2240 |
| Saponification degree of PVA (mol %) | 86.3 | 95.2 | 88.6 | 71.4 | 98.2 | 83.1 | 84.5 | 86.3 | 81.8 |

TABLE 1-continued

|  |  | Example 1 | Example 2 | Example 3 | Example 4 | Example 5 | Example 6 | Example 7 | Example 8 | Example 9 |
|---|---|---|---|---|---|---|---|---|---|---|
| Mass ratio | PVA | 55.5 | 60.0 | 41.5 | 58.4 | 59.6 | 11.2 | 79.8 | 70.6 | 11.6 |
| (%) | PAN | 44.5 | 40.0 | 58.5 | 41.6 | 40.4 | 88.8 | 20.2 | 29.4 | 88.4 |
| Graft rate (%) | | 78 | 65 | 137 | 69 | 66 | 769 | 24 | 40 | 739 |
| Mass average molecular weight of PAN homopolymer | | 105100 | 124500 | 156200 | 135600 | 128400 | 131200 | 146400 | 141200 | 156200 |
| Reductive degradation potential (V) | | 0.010 | 0.015 | 0.005 | 0.015 | 0.015 | 0.004 | 0.030 | 0.030 | 0.004 |

Example 2

The amount of bis (4-t-butylcyclohexyl) peroxydicarbonate in Example 1 was altered to 0.15 parts by mass, the amount stocked of vinyl acetate was altered to 630 parts by mass, and polymerization was carried out at 60° C. for 5 hours. The polymerization rate was 80%. Unreacted vinyl acetate was removed in a similar manner as in Example 1, and then the resultant solution was diluted with methanol so that the concentration of polyvinyl acetate would be 30 mass %. To this polyvinyl acetate solution (2000 parts by mass), methanol solution of sodium hydroxide (concentration of 10 mass %, 20 parts by mass) was added, followed by saponification reaction at 30° C. for 2.5 hours.

Neutralization, filtration and drying were carried out in a similar manner as in Example 1 to give PVA having an average degree of polymerization of 1650 and a saponification degree of 95.2 mol %. Polymerization of PAN was carried out in a similar manner as in Example 1 using the obtained PVA to prepare binder B. The mass ratio of PVA and PAN in the binder B was 60.0:40.0, the graft rate was 65%, and the average molecular weight of PAN homopolymer was 124500. Composition ratio, graft rate, and mass average molecular weight of the PAN homopolymer were measured in a similar manner as in Example 1. The same applies to the following Examples 3 to 9.

Example 3

The amount of vinyl acetate in Example 1 was altered to 930 parts by mass, the amount of polymerization initiator bis (4-t-butylcyclohexyl) peroxydicarbonate in Example 1 was altered to 0.15 parts by mass, and polymerization was carried out at 60° C. for 5 hours. The polymerization rate was 70%. Dilution with methanol was conducted so that the concentration of polyvinyl acetate would be 30 mass %. To this polyvinyl acetate solution (2000 parts by mass), methanol solution of sodium hydroxide (concentration of 10 mass %, 20 parts by mass) was added, followed by saponification reaction at 30° C. for 1.5 hours.

Neutralization, filtration and drying were carried out in a similar manner as in Example 1 to give PVA having an average degree of polymerization of 2990 and a saponification degree of 88.6 mol %. Polymerization of PAN was carried out in a similar manner as in Example 1 using the obtained PVA to prepare binder C. The mass ratio of PVA and PAN in the binder C was 41.5:58.5, the graft rate was 137%, and the mass average molecular weight of PAN homopolymer was 156200.

Example 4

The amount of vinyl acetate in Example 1 was altered to 630 parts by mass, the amount of polymerization initiator bis (4-t-butylcyclohexyl) peroxydicarbonate in Example 1 was altered to 0.15 parts by mass, and polymerization was carried out at 60° C. for 5 hours. The polymerization rate was 75%. Dilution with methanol was conducted so that the concentration of polyvinyl acetate would be 30 mass %. To this polyvinyl acetate solution (2000 parts by mass), methanol solution of sodium hydroxide (concentration of 10 mass %, 20 parts by mass) was added, followed by saponification reaction at 30° C. for 0.5 hours.

Neutralization, filtration and drying were carried out in a similar manner as in Example 1 to give PVA having an average degree of polymerization of 1740 and a saponification degree of 71.4 mol %. Polymerization of PAN was carried out in a similar manner as in Example 1 using the obtained PVA to prepare binder D. The mass ratio of PVA and PAN in the binder D was 58.4:41.6, the graft rate was 69%, and the mass average molecular weight of PAN homopolymer was 135600.

Example 5

The saponification reaction as in Example 2 was performed at 30° C. for 3 hours, and the rest of the conditions were carried out in a similar manner as in Example 2 to prepare binder E. The PVA obtained had an average degree of polymerization of 1610 and a saponification degree of 98.2%. The mass ratio of PVA and PAN in the binder E was 59.6:40.4, the graft rate was 66%, and the mass average molecular weight of PAN homopolymer was 128400.

Example 6

The polymerization reaction of polyvinyl acetate as in Example 2 was performed for 6 hours, the duration of saponification was altered to 1 hour, and the rest of the conditions were carried out in a similar manner as in Example 2 to prepare PVA. The PVA obtained had an average degree of polymerization of 1820 and a saponification degree of 83.1%. Preparation of binder F was carried out by altering the amount of PVA to 1.40 parts by mass, and the rest of the conditions were carried out in a similar manner as in Example 1. The mass ratio of PVA and PAN in the obtained binder F was 11.2:88.8, the graft rate was 769%, and the mass average molecular weight of PAN homopolymer was 131200.

Example 7

The amount of vinyl acetate in Example 2 was altered to 800 parts by mass, the duration of polymerization was altered to 4 hours, the duration of saponification was altered to 1 hour, and the rest of the conditions were carried out in a similar manner as in Example 2 to prepare PVA. The PVA obtained had an average degree of polymerization of 2230 and a saponification degree of 84.5%. The PVA thus obtained was used to prepare binder G. Preparation of binder G was carried out by altering the amount of PVA in Example 1 to 10.0 parts by mass, and the rest of the conditions were carried out in a similar manner as in Example 1. The mass ratio of PVA and PAN in the obtained binder G was 79.8:20.2, the graft rate was 24%, and the mass average molecular weight of PAN homopolymer was 146400.

Example 8

The amount of vinyl acetate in Example 2 was altered to 700 parts by mass, the duration of polymerization was altered to 5 hours, and the rest of the conditions were carried out in a similar manner as in Example 2 to prepare PVA. The PVA obtained had an average degree of polymerization of 1980 and a saponification degree of 86.3%. The PVA thus obtained was used to prepare binder H. Preparation of binder H was carried out by altering the amount of PVA in Example 1 to 9.0 parts by mass, and the rest of the conditions were carried out in a similar manner as in Example 1. The mass ratio of PVA and PAN in the obtained binder H was 70.6:29.4, the graft rate was 40%, and the mass average molecular weight of PAN homopolymer was 141200.

Example 9

The amount of vinyl acetate in Example 2 was altered to 800 parts by mass, the duration of reaction was altered to 6 hours, the duration of saponification was altered to 1 hour, and the rest of the conditions were carried out in a similar manner as in Example 2 to prepare PVA. The PVA obtained had an average degree of polymerization of 2240 and a saponification degree of 81.8%. The PVA thus obtained was used to prepare binder I. Preparation of binder I was carried out by altering the amount of PVA in Example 1 to 1.50 parts by mass, and the rest of the conditions were carried out in a similar manner as in Example 1. The mass ratio of PVA and PAN in the obtained binder I was 11.6:88.4, the graft rate was 739%, and the mass average molecular weight of PAN homopolymer was 156200.

Comparative Example 1

The amount of vinyl acetate stocked during polyvinyl acetate preparation in Example 1 was altered to 550 parts by mass, the amount of methanol was altered to 500 parts by mass, the amount of bis (4-t-butylcyclohexyl) peroxydicarbonate was altered to 0.3 parts by mass, and the rest of the conditions were carried out in a similar manner as in Example 1 to prepare PVA. The obtained PVA had an average degree of polymerization of 250 and a saponification degree of 87.8 mol %. Preparation of binder J was carried out in a similar manner as in Example 1. The mass ratio of PVA and PAN in the obtained binder J was 55.5:44.5, the graft rate was 78%, and the mass average molecular weight of PAN homopolymer was 99800.

Comparative Example 2

The amount of vinyl acetate stocked during polyvinyl acetate preparation in Example 1 was altered to 3000 parts by mass, the amount of methanol was altered to 500 parts by mass, the amount of bis (4-t-butylcyclohexyl) peroxydicarbonate was altered to 0.15 parts by mass, the duration of the reaction was altered to 12 hours, the duration of saponification was altered to 2.5 hours, and the rest of the conditions were carried out in a similar manner as in Example 1 to prepare PVA. The obtained PVA had an average degree of polymerization of 3620 and a saponification degree of 93.2 mol %. Preparation of binder K was carried out in a similar manner as in Example 1, except that the amount of PVA in Example 1 was altered to 9.00 parts by mass. The mass ratio of PVA and PAN in the obtained binder K was 62.6:37.4, the graft rate was 58%, and the mass average molecular weight of PAN homopolymer was 212500. Attempts were made to prepare slurry for electrode by using the binder K. Aggregation of conductive material due to insoluble binder component was observed, and it was difficult to apply the slurry for electrode.

Comparative Example 3

The amount of vinyl acetate stocked during polyvinyl acetate preparation in Example 1 was altered to 600 parts by mass, the duration of the reaction was altered to 6 hours, the duration of saponification was altered to 0.5 hour, and the rest of the conditions were carried out in a similar manner as in Example 1 to prepare PVA. The obtained PVA had an average degree of polymerization of 630 and a saponification degree of 65.1 mol %.

Preparation of binder L was carried out in a similar manner as in Example 1, except that the amount of PVA in Example 1 was altered to 6.20 parts by mass, and the duration of reaction was altered to 10 hours. The mass ratio of PVA and PAN in the obtained binder L was 75.5:24.5, the graft rate was 31%, and the mass average molecular weight of PAN homopolymer was 138200.

Comparative Example 4

The amount of vinyl acetate stocked during polyvinyl acetate preparation in Example 1 was altered to 630 parts by mass, the duration of the reaction was altered to 5 hours, the duration of saponification was altered to 0.5 hour, and the rest of the conditions were carried out in a similar manner as in Example 1 to prepare PVA. The obtained PVA had an average degree of polymerization of 1710 and a saponification degree of 54.9 mol %. Preparation of binder M was carried out in a similar manner as in Example 1, except that the amount of PVA in Example 1 was altered to 6.5 parts by mass. The mass ratio of PVA and PAN in the obtained binder M was 41.8:58.2, the graft rate was 135%, and the mass average molecular weight of PAN homopolymer was 128800.

Comparative Example 5

The amount of vinyl acetate stocked during polyvinyl acetate preparation in Example 1 was altered to 950 parts by mass, and the rest of the conditions were carried out in a similar manner as in Example 1 to prepare PVA. The obtained PVA had an average degree of polymerization of 2940 and a saponification degree of 88.1 mol %.

Preparation of binder N was carried out in a similar manner as in Example 1, except that the amount of PVA in Example 1 was altered to 0.80 parts by mass. The mass ratio of PVA and PAN in the obtained binder N was 7.6:92.4, the graft rate was 1179%, and the mass average molecular weight of PAN homopolymer was 175300.

Comparative Example 6

The amount of vinyl acetate stocked during polyvinyl acetate preparation in Example 1 was altered to 1000 parts by mass, the amount of bis (4-t-butylcyclohexyl) peroxydicarbonate was altered to 0.15 parts by mass, the duration of the reaction was altered to 6 hours, the duration of saponification was altered to 2.5 hours, and the rest of the conditions were carried out in a similar manner as in Example 1 to prepare PVA. The obtained PVA had an average degree of polymerization of 3380 and a saponification degree of 95.1 mol %.

Preparation of binder O was carried out in a similar manner as in Example 1, except that the amount of PVA in Example 1 was altered to 12.00 parts by mass. The mass ratio of PVA and PAN in the obtained binder P was 92.5:7.5, the graft rate was 8%, and the mass average molecular weight of PAN homopolymer was 186100. Attempts were made to prepare slurry for electrode by using the binder O. Aggregation of conductive material due to insoluble binder component was observed, and it was difficult to apply the slurry for electrode.

Comparative Example 7

The amount of vinyl acetate stocked during polyvinyl acetate preparation in Example 1 was altered to 1100 parts by mass, the amount of bis (4-t-butylcyclohexyl) peroxydicarbonate was altered to 0.15 parts by mass, the duration of the reaction was altered to 12 hours, the duration of saponification was altered to 0.5 hours, and the rest of the conditions were carried out in a similar manner as in Example 1 to prepare PVA. The obtained PVA had an average degree of polymerization of 3510 and a saponification degree of 75.4 mol %. Preparation of binder P was carried out in a similar manner as in Example 1, except that the amount of PVA in Example 1 was altered to 13.00 parts by mass. The mass ratio of PVA and PAN in the obtained binder P was 94.5:5.5, the graft rate was 6%, and the mass average molecular weight of PAN homopolymer was 191200. Attempts were made to prepare slurry for electrode by using the binder P. Aggregation of conductive material due to insoluble binder component was observed, and it was difficult to apply the slurry for electrode.

Comparative Example 8

The amount of vinyl acetate stocked during polyvinyl acetate preparation in Example 1 was altered to 930 parts by mass, the amount of bis (4-t-butylcyclohexyl) peroxydicarbonate was altered to 0.15 parts by mass, the duration of the reaction was altered to 12 hours, the duration of saponification was altered to 2.5 hours, and the rest of the conditions were carried out in a similar manner as in Example 1 to prepare PVA. The obtained PVA had an average degree of polymerization of 2980 and a saponification degree of 95.0 mol %. Preparation of binder Q was carried out in a similar manner as in Example 1, except that the amount of PVA in Example 1 was altered to 13.00 parts by mass. The mass ratio of PVA and PAN in the obtained binder Q was 95.0:5.0, the graft rate was 5%, and the mass average molecular weight of PAN homopolymer was 189100.

Comparative Example 9

Polyvinylidene fluoride ("KF Polymer (registered trademark) #1120" manufactured by KUREHA CORPORATION) was used as binder R.

TABLE 2

|  |  | Comparative Example 1 | Comparative Example 2 | Comparative Example 3 | Comparative Example 4 | Comparative Example 5 |
|---|---|---|---|---|---|---|
| Binder |  | J | K | L | M | N |
| Polymerization degree of PVA |  | 250 | 3620 | 630 | 1710 | 2490 |
| Saponification degree of PVA (mol %) |  | 87.8 | 93.2 | 65.1 | 54.9 | 88.1 |
| Mass ratio (%) | PVA | 55.5 | 62.6 | 75.5 | 41.8 | 7.6 |
|  | PAN | 44.5 | 37.4 | 24.5 | 58.2 | 92.4 |
|  | polyvinylidene fluoride |  |  |  |  |  |
| Graft rate (%) |  | 78 | 58 | 31 | 135 | 1179 |
| Mass average molecular weight of PAN homopolymer |  | 99800 | 212500 | 138200 | 128800 | 175300 |
| Reductive degradation potential (V) |  | 0.023 | Difficult to make an electrode | 0.042 | 0.045 | 0.010 |

|  |  | Comparative Example 6 | Comparative Example 7 | Comparative Example 8 | Comparative Example 9 |
|---|---|---|---|---|---|
| Binder |  | O | P | Q | R |
| Polymerization degree of PVA |  | 3380 | 3510 | 2980 |  |
| Saponification degree of PVA (mol %) |  | 95.1 | 75.4 | 95.0 |  |
| Mass ratio (%) | PVA | 92.5 | 94.5 | 95.0 |  |
|  | PAN | 7.5 | 5.5 | 5.0 |  |
|  | polyvinylidene fluoride |  |  |  | 100 |
| Graft rate (%) |  | 8 | 6 | 5 |  |
| Mass average molecular weight of PAN homopolymer |  | 186100 | 191200 | 189100 |  |

TABLE 2-continued

| | | | |
|---|---|---|---|
| Reductive degradation potential (V) | Difficult to make an electrode | 0.038 | 0.040 |

Example 10

Binder A was used to prepare a slurry for positive electrode in accordance with the following procedure. Peel strength of the slurry for positive electrode was measured. Further, negative electrode and lithium ion secondary battery were made using the slurry for negative electrode, and the peel strength, discharge rate characteristics, and cycle characteristics of the electrode were evaluated. Results are shown in Table 3.

Further, acetylene black (1.5 parts by mass by solids in slurry for negative electrode, Denka Black (registered trademark) "HS-100" manufactured by Denka Company Limited) as a conductive assistant, NMP dispersion of carbon nanofiber "Flotube 9000" (1.5 parts by mass by solids in slurry for negative electrode, manufactured by CNano Technology, Ltd.) as a fibrous carbon as a conductive assistant, and the binder solution (7 parts by mass by solids in slurry for negative electrode) were mixed by agitation. After mixing, artificial graphite (80 parts by mass by solids in slurry

TABLE 3

| | | | Example | | | | | | | | | Comparative Example | | |
|---|---|---|---|---|---|---|---|---|---|---|---|---|---|---|
| | | | 10 | 11 | 12 | 13 | 14 | 15 | 16 | 17 | 18 | 10 | 11 | 12 |
| Slurry composition for negative electrode | Binder solution | Binder | A | B | C | D | E | F | G | H | I | J | K | L |
| | | Amount of binder | 7 | 7 | 7 | 7 | 7 | 7 | 7 | 7 | 7 | 7 | Difficult to make an electrode | 7 |
| | Negative electrode active material | Amount of silicon powder | 10 | 10 | 10 | 10 | 10 | 10 | 10 | 10 | 10 | 10 | | 10 |
| | | Amount of artificial graphite | 80 | 80 | 80 | 80 | 80 | 80 | 80 | 80 | 80 | 80 | | 80 |
| | Conductive assistant | Amount of acetylene black | 1.5 | 1.5 | 1.5 | 1.5 | 1.5 | 1.5 | 1.5 | 1.5 | 1.5 | 1.5 | | 1.5 |
| | | Amount of carbon nano fiber | 1.5 | 1.5 | 1.5 | 1.5 | 1.5 | 1.5 | 1.5 | 1.5 | 1.5 | 1.5 | | 1.5 |
| Evaluation | Peel strength (mN/mm) | | 190 | 210 | 260 | 220 | 215 | 160 | 255 | 230 | 155 | 120 | | 185 |
| | High rate discharge capacity retention rate (%) | | 89 | 88 | 91 | 85 | 85 | 90 | 73 | 73 | 92 | 80 | | 68 |
| | Cycle capacity retention rate (%) | | 85 | 86 | 90 | 86 | 83 | 90 | 70 | 69 | 91 | 77 | | 65 |

| | | | Comparative Example | | | | | |
|---|---|---|---|---|---|---|---|---|
| | | | 13 | 14 | 15 | 16 | 17 | 18 |
| Slurry composition for negative electrode | Binder solution | Binder | M | N | O | P | Q | R |
| | | Amount of binder | 7 | 7 | Difficult to make an electrode | Difficult to make an electrode | 7 | 7 |
| | Negative electrode active material | Amount of silicon powder | 10 | 10 | | | 10 | 10 |
| | | Amount of artificial graphite | 80 | 80 | | | 80 | 80 |
| | Conductive assistant | Amount of acetylene black | 1.5 | 1.5 | | | 1.5 | 1.5 |
| | | Amount of carbon nano fiber | 1.5 | 1.5 | | | 1.5 | 1.5 |
| Evaluation | Peel strength (mN/mm) | | 220 | 120 | | | 230 | 150 |
| | High rate discharge capacity retention rate (%) | | 64 | 81 | | | 66 | 79 |
| | Cycle capacity retention rate (%) | | 63 | 75 | | | 62 | 70 |

The amount of binder solution, negative electrode active material, and conductive assistant is in terms of solids in a slurry for negative electrode. The unit is mass %.

<Preparation of Slurry for Negative Electrode>

Binder A obtained (8 parts by mass) was dissolved in N-methylpyrrolidone (92 parts by mass, hereinafter abbreviated as NMP) to give a binder solution.

for negative electrode, KS-6 (name of product) manufactured by TIMCAL Ltd.) as a negative electrode active material and silicon powder (10 parts by mass by solids in slurry for negative electrode, 350 mesh, purity: 99.9%, manufactured by Nilaco Corporation) as a negative electrode active material were mixed by agitation to obtain the slurry for negative electrode. The slurry for negative electrode mentioned here comprises a binder solution, a negative electrode active material, and a conductive assistant.

<Binding Property (Peel Strength)>

The obtained slurry for negative electrode was applied on a copper foil so that the film thickness after drying would be 100 μm, followed by preliminary drying at 80° C. for 10 minutes. Subsequently, the slurry was dried at 105° C. for 1 hour to give a negative electrode plate.

The obtained negative electrode plate was pressed with a roll press machine at a linear pressure of 0.2 to 3.0 ton/cm, and adjustment was made so that the average thickness of the negative electrode plate would be 90 μm. The obtained negative electrode plate was cut into a width of 1.5 cm. The surface of the negative electrode active material (the surface on the side coated with the slurry for negative electrode) of the negative electrode plate was attached to a stainless steel plate using a double-sided tape. Subsequently, an adhesive tape was attached to the copper foil on the surface (the surface opposite to the side coated with the slurry for negative electrode) of the negative electrode to prepare a test piece. The stress when the adhesive tape attached to the copper foil was peeled off at 23° C. and relative humidity of 50%, with a peeling direction of 180° and a peeling speed of 50 mm/min was measured. This measurement was repeated 5 times to obtain an average value, and was taken as peel strength.

<Preparation of Negative Electrode>

The prepared slurry for negative electrode was applied on both sides of the 10 μm thick copper foil using an automatic coating machine by an amount of 70 g/m$^2$, followed by preliminarily drying at 80° C. for 10 minutes. Subsequently, pressing was performed with a roll press machine at a linear pressure of 0.2 to 3 ton/cm, and the thickness of the negative electrode plates were adjusted to 90 μm including both sides. Further, the negative electrode plate was cut into a width of 55 mm to prepare a rectangular negative electrode plate. Nickel current collector tab was ultrasonically welded to the end portion of the negative electrode plate, followed by drying at 105° C. for 1 hour in order to completely remove volatile components such as residual solvent and adsorbed moisture, thereby giving a negative electrode.

<Preparation of Positive Electrode>

Li(Ni$_{1/3}$Mn$_{1/3}$Co$_{1/3}$)O$_2$ (87.42 parts by mass, "CELL-SEED (registered trademark) 111", manufactured by NIPPON CHEMICAL INDUSTRIAL CO., LTD.) as a positive electrode active material, polyvinylidene fluoride (7 parts by mass by solids, "KF Polymer (registered trademark) #1120", manufactured by KUREHA CORPORATION) as a binder, acetylene black (3.72 parts by mass, Denka Black (registered trademark) "HS-100" manufactured by Denka Company Limited), NMP dispersion of carbon nanofiber "Flotube 9000" (1.86 parts by mass by solids, manufactured by CNano Technology, Ltd.) as a fibrous carbon, and NMP (appropriate amount so that the total solids would be 50 mass %) were added and mixed by agitation, thereby giving a slurry for positive electrode.

Onto both sides of an aluminum foil having a thickness of 20 μm, the slurry for positive electrode thus obtained was applied using an automatic coating machine by an amount of 140 g/m$^2$, followed by preliminarily drying at 80° C. for 10 minutes. Subsequently, pressing was performed with a roll press machine at a linear pressure of 0.2 to 3 ton/cm, and the thickness of the positive electrode plates were adjusted to have 148 μm including both sides. Further, the positive electrode plate was cut into a width of 54 mm to prepare a rectangular positive electrode plate. Aluminum current collector tab was ultrasonically welded to the end portion of the positive electrode plate, followed by drying at 105° C. for 1 hour in order to completely remove volatile components such as residual solvent and adsorbed moisture, thereby giving a positive electrode.

<Preparation of Battery>

The positive electrode and the negative electrode thus obtained were separated through a polyethylene microporous membrane separator having a thickness of 25 μm and a width of 60 mm and wound together to provide a spiral wound body. The wound body was then inserted into a battery can. Subsequently, a nonaqueous electrolytic solution (5 ml, ethylene carbonate/methylethyl carbonate=30/70 (mass ratio) mixture) in which LiPF$_6$ as an electrolyte was dissolved to have 1 mol/L concentration was injected into a battery container. Then the inlet was caulked and sealed, thereby obtaining a cylindrical lithium secondary battery having a diameter of 18 mm and a height of 65 mm. Performance of the lithium ion secondary battery thus obtained was evaluated in accordance with the procedure described below.

<Discharge Rate Characteristics (High Rate Discharge Capacity Retention Rate)>

The lithium ion secondary battery prepared was subjected to charging with constant current constant voltage charging profile (limited to 4.29 V and 0.2 ItA) at 25° C., and then the battery was discharged at a constant current of 0.2 ItA to 2.69 V. Subsequently, the discharge current was changed to 0.2 ItA and to 1 ItA, and the discharge capacity with respect to each discharge current was measured. The recovery charge in each measurement was conducted with constant current constant voltage charging profile (4.29 V (1 ItA cut)). The high rate discharge capacity retention rate was calculated as the rate of capacity measured in 1 ItA discharge to the capacity measured in the second 0.2 ItA discharge.

<Cycle Characteristics (Cycle Capacity Retention Rate)>

At an environmental temperature of 25° C., charging with constant current constant voltage charging profile (charging voltage of 4.29 V, 1 ItA) and discharging with constant current (discharge terminating voltage of 2.69 V, 1 ItA) were performed. Cycles of charging and discharging were repeated, and the rate of the discharge capacity measured in the 500th cycle to the discharge capacity measured in the 1st cycle was calculated as the cycle capacity retention rate.

Examples 11 to 18

Binder A in Example 10 was altered to the binders shown in Table 3. The rest of the procedures were carried out in a similar manner as in Example 10, to conduct each of the evaluations. The results are shown in Table 3.

Comparative Examples 10 to 18

A slurry for negative electrode, a negative electrode, a positive electrode, and a lithium ion secondary battery were prepared according to the method shown in Example 10, altering to the binders shown in Table 3. Subsequently, various evaluations were carried out. The results are shown in Table 3.

From the results shown in Tables 1 and 2, the binder composition in the scope of the present invention showed superior reduction resistance. In addition, from the results shown in Table 3, binding property (peel strength) between the layer of negative electrode active material and the current collector was shown to be superior. Further, the lithium ion secondary battery manufactured using the binder composition in the scope of the present invention showed superior cycle characteristics and discharge rate characteristics.

The invention claimed is:

1. A slurry for negative electrode comprising:
a binder composition for negative electrode comprising a graft copolymer obtained by graft copolymerizing, with polyvinyl alcohol, a monomer containing (meth)acrylonitrile as a main component;
a negative electrode active material; and
a conductive assistant, wherein:
the polyvinyl alcohol has an average degree of polymerization of 300 to 3000;
the polyvinyl alcohol has a saponification degree of 70 to 100 mol %;
the graft copolymer has a polyvinyl alcohol amount of 10 to 90 mass %;
the graft copolymer has a poly(meth)acrylonitrile amount of 90 to 10 mass %; and
a homopolymer of poly(meth)acrylonitrile generated during the graft copolymerization has a mass average molecular weight of 30000 to 250000.

2. The slurry for negative electrode according to claim 1, wherein:
the graft copolymer has a graft rate of 10 to 900%.

3. The slurry for negative electrode according to claim 1, wherein a solid content of the binder composition for negative electrode is 1 to 20 mass % of a total solid of the slurry for negative electrode.

4. The slurry for negative electrode according to claim 1, wherein the negative electrode active material comprises at least one selected from graphite and silicon compounds.

5. The slurry for negative electrode according to claim 1, wherein the conductive assistant comprises at least one selected from the group consisting of: (i) fibrous carbon; (ii) carbon black; and (iii) carbon composite in which fibrous carbon and carbon black are combined with each other.

6. The slurry for negative electrode according to claim 3, wherein the negative electrode active material comprises at least one selected from graphite and silicon compounds.

7. The slurry for negative electrode according to claim 3, wherein the conductive assistant comprises at least one member selected from the group consisting of: (i) fibrous carbon; (ii) carbon black; and (iii) carbon composite in which fibrous carbon and carbon black are combined with each other.

8. The slurry for negative electrode according to claim 4, wherein the conductive assistant comprises at least one member selected from the group consisting of: (i) fibrous carbon; (ii) carbon black; and (iii) carbon composite in which fibrous carbon and carbon black are combined with each other.

9. A negative electrode comprising:
a metal foil; and
a coating formed on the metal foil and comprising the slurry for negative electrode according to claim 1.

10. A lithium ion secondary battery comprising the negative electrode according to claim 9.

11. A negative electrode comprising:
a metal foil; and
a coating formed on the metal foil and comprising the slurry for negative electrode according to claim 3.

12. A negative electrode comprising:
a metal foil; and
a coating formed on the metal foil and comprising the slurry for negative electrode according to claim 4.

13. A negative electrode comprising:
a metal foil; and
a coating formed on the metal foil and comprising the slurry for negative electrode according to claim 5.

* * * * *